United States Patent Office 3,223,517
Patented Dec. 14, 1965

3,223,517
CONTROLLING TOBACCO SUCKER GROWTH
Walter W. Abramitis, Downers Grove, and Richard A. Reck, Hinsdale, Ill., assignors to Armour and Company, Chicago, Ill., a corporation of Delaware
No Drawing. Filed June 29, 1962, Ser. No. 206,196
5 Claims. (Cl. 71—2.7)

This invention relates to plant growth control, and more particularly to the control of undesirable secondary growth in plants.

In various plants, such as, for example, tobacco, tomato, cotton, soybean plants, etc., undesirable secondary growth, which is generally referred to as "suckers," creates a serious problem because the suckers develop rapidly to shade desired portions of the plant and tend to ruin the quality of such desired portions. In the tobacco plant, secondary buds form at the points where the leaf stems join the plant, and later after the flower is removed grow rapidly to form sucker growths extending over the leaves. The sucker growths can be removed manually, but this is a laborious and expensive proceeding. The use of sucker oil and chemicals, while effective in control of such secondary growth, nevertheless has serious disadvantages. The sucker oil tends to form leaf and stalk damage, causing soft spots that are attacked by microbes, and also there is a lack of control of the lower sucker stalks. The chemicals produce cellular changes in the leaf, tending to reduce the filling capacity of the treated tobacco for cigarette manufacture, etc., and the cost of the chemicals is high.

Applicants have discovered that the undesirable secondary growth of plants can be effectively controlled through the spray application of tertiary and secondary amines, and without entailing the disadvantages described above. The tertiary and secondary amines can be applied in a coarse stream to the stem or other portion of the plant to effect a complete control of such sucker growth and without plant injury.

A primary object, therefore, of the invention is to provide a method for the treatment of plants for the control of undesirable secondary growth therein. A further object is to provide for the control of undesirable secondary growth in tobacco and other plants by applying to the plants control agents which prevent the secondary growth while at the same time avoiding injury to the plants. Other specific objects and advantages will appear as the specification proceeds.

In one embodiment of our invention, we apply to the plant tertiary or secondary ammonium salts, including the organic and inorganic salts, in an aqueous solution or emulsion. For example, the secondary or tertiary ammonium salts may be applied in a coarse water spray directed to the stem of the plant, and such spray application is found to give effective control.

Such control agents may be described by the following formulas:

(1) 

$R_1$ and $R_2$ may be methyl or ethyl.
$R_3$ is a long-chain aliphatic radical containing 8 to 18 carbon atoms.
X is one of many anions.

(2) 

$R_1$ may be methyl or ethyl.

$R_2$ is a long-chain aliphatic radical containing 8 to 18 carbon atoms.
X is one of many anions.

In the above formulas, it is believed that the ammonium cation is the effective sucker control agent and may be employed in combination with anions. Examples are organic salts, such as acetates, levulinates, malonates, succinates, phthalates, naphthenates, citrates, benzoates, etc., or inorganic salts, such as, for example, nitrates, chlorides, sulfates, phosphates, etc. Of the foregoing growth control agents, the following have been particularly effective:

(1) Dodecyldimethylamine acetate
(2) Dodecylmethylamine acetate
(3) Cocodimethylamine acetate.

Specific examples illustrating the control method, etc., may be set out as follows:

Example I

The method of application was at the time of topping. 3–15 ml. solutions were applied to the top of the plant and allowed to run down. The field results were as follows:

FLUE-CURED TOBACCO

| Material | Conc., p.p.m. | Sucker control, percent | Plant injury |
|---|---|---|---|
| Dodecyldimethylamine acetate | 10 | 0 | None |
| | 100 | 0 | Do. |
| | 1,000 | Slight | Do. |
| | 10,000 | 100 | Do. |
| Dodecylmethylamine acetate | 10 | 0 | Do. |
| | 100 | 0 | Do. |
| | 1,000 | 0 | Do. |
| | 10,000 | (1) | Do. |

[1] Satisfactory (85%).

Example II

The method was carried out as described in Example I on burley tobacco, and the field results were as follows:

BURLEY TOBACCO

| Material | Conc., p.p.m. | Sucker control percent | Plant injury |
|---|---|---|---|
| Dodecyldimethylamine acetate. | 5,000 | (1) | None. |
| | 10,000 | 100 | Slight. |
| | 20,000 | 100 | Some stem girdling at ground level. |
| Dodecylmethylamine acetate. | 5,000 | 25 | None. |
| | 10,000 | 50-100 | Do. |
| | 20,000 | (2) | Do. |

[1] Satisfactory.  [2] Satisfactory (85%).

Example III

A series of salts of cocodimethylamine were prepared and tested in the greenhouse for tobacco sucker control. At the time of flowering, the plants were topped and given and overall spray (20 ml. each). The concentrations of the treating salt were varied between ranges of 0.125% to 0.5% and the effect at the different concentrations was observed at weekly intervals. The results were as follows:

Cocodimethylamine acetate at a concentration of 0.125% gave no growth after a week but a slight sucker growth after two weeks. At a concentration of 0.5%, there was no growth over a three-week interval.

Cocodimethylamine levulinate at concentrations of 0.125% and 0.25% gave no growth after a week, but a slight growth after two weeks. At a concentration of 0.5%, there was no growth observed over a three-week period.

Cocodimethylamine malonate disalt at concentrations of 0.125% and at 0.25% gave no growth after a week, but slight growth after two weeks. At a concentration of 0.5%, there was no sucker growth observed over a three-week period.

Cocodimethylamine phthalate disalt, at concentrations of 0.125% and 0.25% resulted in no sucker growth after a week's interval, and a slight growth after a two-week interval. At a concentration of 0.5%, there was no growth over a period of three weeks.

Cocodimethylamine succinate-disalt produced no sucker growth for a week following treatment, but a slight growth after two weeks. At a concentration of 0.5%, there was no growth observed during a three-week interval.

Cocodimethylamine naphthenate at concentrations of 0.125% and 0.25% gave slight growth during one and two-week intervals, but at a concentration of 0.5%, there was no growth observed for the first two weeks after treatment and a slight growth observed after three weeks following treatment.

Cocodimethylamine nitrate at concentrations of 0.125% and .25% permitted slight sucker growth during the first and second week intervals, but at a concentration of 0.5%, permitted no sucker growth over a three-week period.

Cocodimethylamine hydrochloride, at concentrations of 0.125% and .25% permitted no growth during the first week following treatment and slight growth at the end of the second week, but at a concentration of 0.5%, permitted no growth during a period of three weeks. The untreated tobacco plant employed as a check in the above tests produced well-developed secondary shoots which were observed at each weekly inspection. In the foregoing tests, no plant injury was observed.

The concentration range may vary widely depending upon various conditions, the type of plant being treated, age of the plant, etc. Generally, we find that a concentration of from 0.125 to 1% is effective for the control of undesirable secondary growth while at the same time avoiding plant injury, and best results have been obtained at the concentrations of from about 0.25% to 0.5%.

Any suitable method of application of the active agent may be employed. We prefer to employ an aqueous solution and to direct the same onto the plant. For some purposes, an emulsion may be desired, and such an emulsion may be prepared by combining the chemical agents in an emulsifier. By way of example, from 3–5% of Ethofat 60/15 (stearic acid containing 5 moles of ethylene oxide) may be combined with the agent and water to form an emulsion. Since the growth control compound is water soluble, the use of an aqueous spray for most purposes will be preferred.

While in the foregoing specification we have set out treating ingredients and procedural steps in considerable detail for the purpose of illustrating the invention, it will be understood that such detail or details may be varied by those skilled in the art without departing from the spirit of our invention.

We claim:
1. A method for treating tobacco plants to control sucker growth therein without producing injury to desired portions of the plants, comprising applying to the plant dodecyldimethylamine acetate in an amount effective to attain said control.

2. A method for treating tobacco plants to control sucker growth therein without producing injury to desired portions of the plants, comprising applying to the plant dodecylmethylamine acetate in an amount effective to attain said control.

3. A method for treating tobacco plants to control sucker growth therein without producing injury to desired portions of the plants, comprising applying to the plant cocodimethylamine acetate in an amount effective to attain said control.

4. A method for treating tobacco plants to control sucker growth therein without producing injury to desired portions of the plants, comprising applying to the plant in an aqueous solution a compound selected from the group consisting of secondary and tertiary amine salts having an ammonium cation wherein one substituent is alkyl containing from 8 to 18 carbon atoms and wherein said cation has from one to two substituents selected from the group consisting of methyl and ethyl; said compound being applied in an amount effective to attain said control.

5. A method for treating tobacco plants to control sucker growth therein without producing injury to desired portions of the plants, comprising applying to the plant in an emulsion a compound selected from the group consisting of secondary and tertiary amine salts having an ammonium cation wherein one substituent is alkyl containing from 8 to 18 carbon atoms and wherein said cation has from one to two substituents selected from the group consisting of methyl and ethyl; said compound being applied in an amount effective to attain said control.

References Cited by the Examiner

UNITED STATES PATENTS 2,751,713  6/1956  Abramitis _____ 71—2.7 X
2,970,048  1/1961  Hamm et al. _____ 71—2.5

OTHER REFERENCES

Plant Regulators, National Academy of Science-National Research Council, publication 384, CBCC positive Data Series No. 2, June 1955, pages b, c, 1, 14 and 15.

LEWIS GOTTS, *Primary Examiner.*